US008181259B2

(12) United States Patent
Meijer et al.

(10) Patent No.: US 8,181,259 B2
(45) Date of Patent: *May 15, 2012

(54) SYSTEM AND METHOD FOR UPGRADING THE FUNCTIONALITY OF A CONTROLLING DEVICE VIA A SECURE PORTABLE ADAPTER DEVICE

(75) Inventors: Gerben Meijer, Hengelo (NL); Jeremy Black, North Tustin, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 1306 days.

This patent is subject to a terminal disclaimer.

(21) Appl. No.: 11/731,553

(22) Filed: Mar. 30, 2007

(65) Prior Publication Data
US 2009/0327727 A1 Dec. 31, 2009

Related U.S. Application Data

(63) Continuation-in-part of application No. 11/726,829, filed on Mar. 23, 2007.

(51) Int. Cl.
*G06F 21/00* (2006.01)
(52) U.S. Cl. ......... 726/27; 726/2; 726/3; 726/4; 726/28; 726/29; 726/30; 713/161; 713/168; 713/182; 713/183; 709/217; 709/218; 709/219; 709/225; 709/229
(58) Field of Classification Search .................. 713/167, 713/168, 171, 193, 155–159, 182–186; 726/27–30, 726/2–8; 709/225, 229
See application file for complete search history.

(56) References Cited

U.S. PATENT DOCUMENTS

| 4,623,887 | A | 11/1986 | Welles, II |
| 4,774,511 | A | 9/1988 | Rumbolt et al. |
| 4,959,810 | A | 9/1990 | Darbee et al. |
| 5,226,077 | A | 7/1993 | Lynn et al. |
| 5,410,326 | A * | 4/1995 | Goldstein ..................... 348/734 |
| 5,537,463 | A | 7/1996 | Escobosa et al. |
| 5,677,953 | A | 10/1997 | Dolphin |
| 5,953,144 | A | 9/1999 | Darbee et al. |
| 6,223,348 | B1 | 4/2001 | Hayes et al. |
| 6,493,688 | B1 * | 12/2002 | Das et al. ......................... 706/20 |
| 6,950,944 | B2 * | 9/2005 | Yager et al. ....................... 726/1 |
| 6,988,267 | B2 | 1/2006 | Harris et al. |
| 7,096,490 | B2 * | 8/2006 | Xiong et al. ..................... 726/3 |
| 7,102,688 | B2 | 9/2006 | Hayes et al. |

(Continued)

OTHER PUBLICATIONS

Henryka et al., "Open Service Architecture for Heterogeneous Home Environment", VTT Technical Research Centre of Finland.*

*Primary Examiner* — Taghi Arani
*Assistant Examiner* — Josnel Jeudy
(74) *Attorney, Agent, or Firm* — Greenberg Traurig, LLP

(57) ABSTRACT

Secure access to a database of upgrade data is provided by storing an encryption key value in an adapter device used to interconnect a first device to be upgraded and a second device that is associated with the database of upgrade data. The second device allows access to the database of upgrade data via the adapter only once the adapter is positively authenticated by the second device through use of the encryption key value stored in the adapter device.

43 Claims, 9 Drawing Sheets

U.S. PATENT DOCUMENTS

| | | | |
|---|---|---|---|
| 7,712,131 B1 * | 5/2010 | Lethe | 726/20 |
| 7,762,470 B2 * | 7/2010 | Finn et al. | 235/492 |
| 2004/0047347 A1 | 3/2004 | Worry et al. | |
| 2005/0195979 A1 | 9/2005 | Arling et al. | |
| 2005/0227773 A1 * | 10/2005 | Lu et al. | 472/60 |
| 2006/0007151 A1 * | 1/2006 | Ram | 345/163 |
| 2007/0058657 A1 | 3/2007 | Holt et al. | |

* cited by examiner

SYSTEM AND METHOD FOR UPGRADING THE FUNCTIONALITY OF A CONTROLLING DEVICE VIA A SECURE PORTABLE ADAPTER DEVICE

RELATED APPLICATION DATA

This application claims the benefit of and is a continuation-in-part of U.S. application Ser. No. 11/726,829, filed Mar. 23, 2007.

BACKGROUND

Universal controlling devices, that is, for example, remote controls which are adaptable to issue commands to a multiplicity of appliances of different type and/or manufacture, and the features and functionality provided by such controlling devices are well known in the art. Early universal controlling devices such as, for example, that described in U.S. Pat. No. 4,623,887 were generally "learners," that is, they were adapted to capture, store, and subsequently play back the command signals of the original equipment remote controls corresponding to the appliances to be controlled. However, the required initial teaching process proved tedious and error prone, and universal controlling devices which included preprogrammed libraries of command codes, such as those described in U.S. Pat. Nos. 4,774,511 or 4,959,810 were introduced to overcome this problem. These universal controlling devices, however, suffer from the potential drawback that an appliance which is responsive to a code which is unknown, i.e., not already present in the preprogrammed library of codes embedded in the device, cannot be controlled.

To alleviate this drawback, multiple methods for upgrading data, software, firmware, etc. of a preprogrammed controlling device (or other device generally) after it has left the factory have been proposed. By way of example, and without limitation, a device may be upgraded by downloading to the device additional command functionality, user interface graphics, appliance command sequences, audio/video content and/or associated metadata, program guide information, firmware/software additions/updates/patches/fixes, weather forecasts, user instructions, transportation time tables, product information, maps, graphics, song lyrics, text, news, stock market information, driving directions, etc. (individually and/or collectively referred to hereinafter as "upgrade data"). Approaches for updating a device may be found in, for example, the aforementioned U.S. Pat. Nos 4,959,810 or 5,226,077, 5,953,144, 5,537,463, 6,223,348, 7,102,688 or U.S. patent application Ser. Nos. 09/804,623, 09/615,473, and 10/287,389. As will be appreciated, in common with the approaches described in these various references are two requirements for establishing a relationship between a target device, using a target controlling device as an example, and a source of upgrade data: first, a means to connect the controlling device, either directly or indirectly, to the source of upgrade data (which may comprise a direct physical cable as contemplated by Ser. No. 09/804,623; a cable including include electrical signal level conversion as contemplated by U.S. Pat. No. 4,959,810; a wireless transmission system as contemplated by U.S. Pat. No. 5,537,463; a "sneaker net" transfer medium such as contemplated by U.S. Pat. No. 6,223, 348; a combination thereof in conjunction with a gateway device to a local or wide area network; or any other suitable means) and second, a means for mutually identifying the upgrade data source and the controlling device to one another as being a qualified provider and recipient, respectively, of the data to be downloaded. This second aspect is critical to ensure, for example, that the controlling device is a legitimate recipient of the upgrade data, that the database from which the upgrade data is drawn is compatible for use with the specific model of controlling device currently connected, that sufficient storage capacity still remains in a controlling device which has been the recipient of previous upgrade data, etc. However, this second aspect is often addressed poorly, if at all, by the prior art discussed above.

Accordingly, a need exists for a system and method to provide upgradeability to a controlling device in a simple manner and with improved mutual identification and authentication of a controlling device and an upgrade data source.

SUMMARY OF THE INVENTION

This invention relates generally to a system and method to enable new command code sets, program instructions, GUI graphics, or other data for use by a controlling device to be provided to that device via download from a local or remote database. In order to facilitate mutual identification and authentication of the participants in this process, i.e., a source of the data and a recipient of the data, an adapter device is provided in the form of a cable, wireless transceiver, pluggable module, etc. Besides providing mechanical coupling between the controlling device and the upgrade service together with any necessary electrical or logical signal conversion, this adapter also serves as a trusted intermediary to manage and coordinate the interactions between the controlling device and the upgrade service source.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
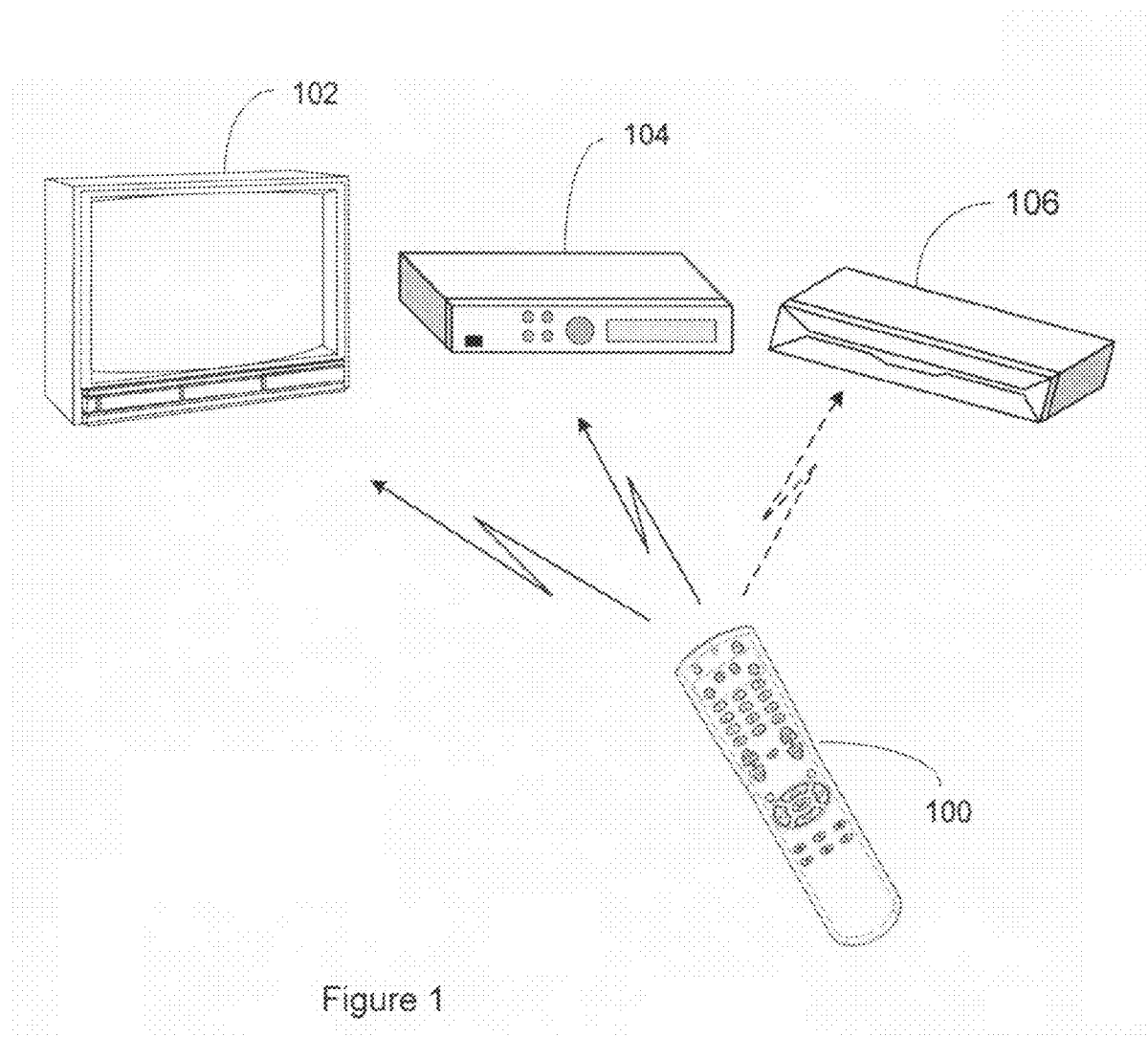
FIG. 1 illustrates an exemplary system in which an upgradeable controlling device may be utilized.
Figure 3:
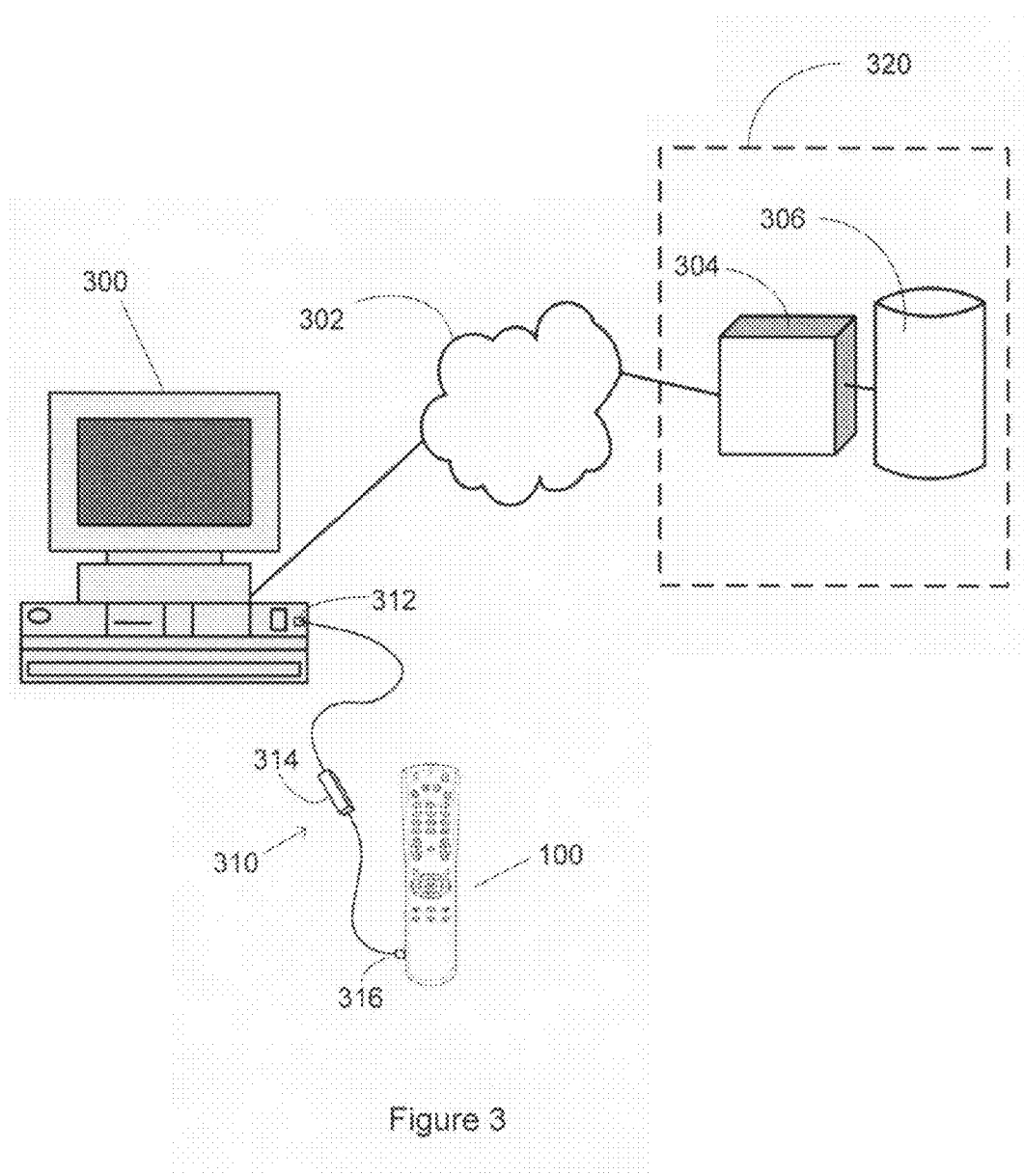
FIG. 3 illustrates an exemplary system by means of which a controlling device may be upgraded.
Figure 8:
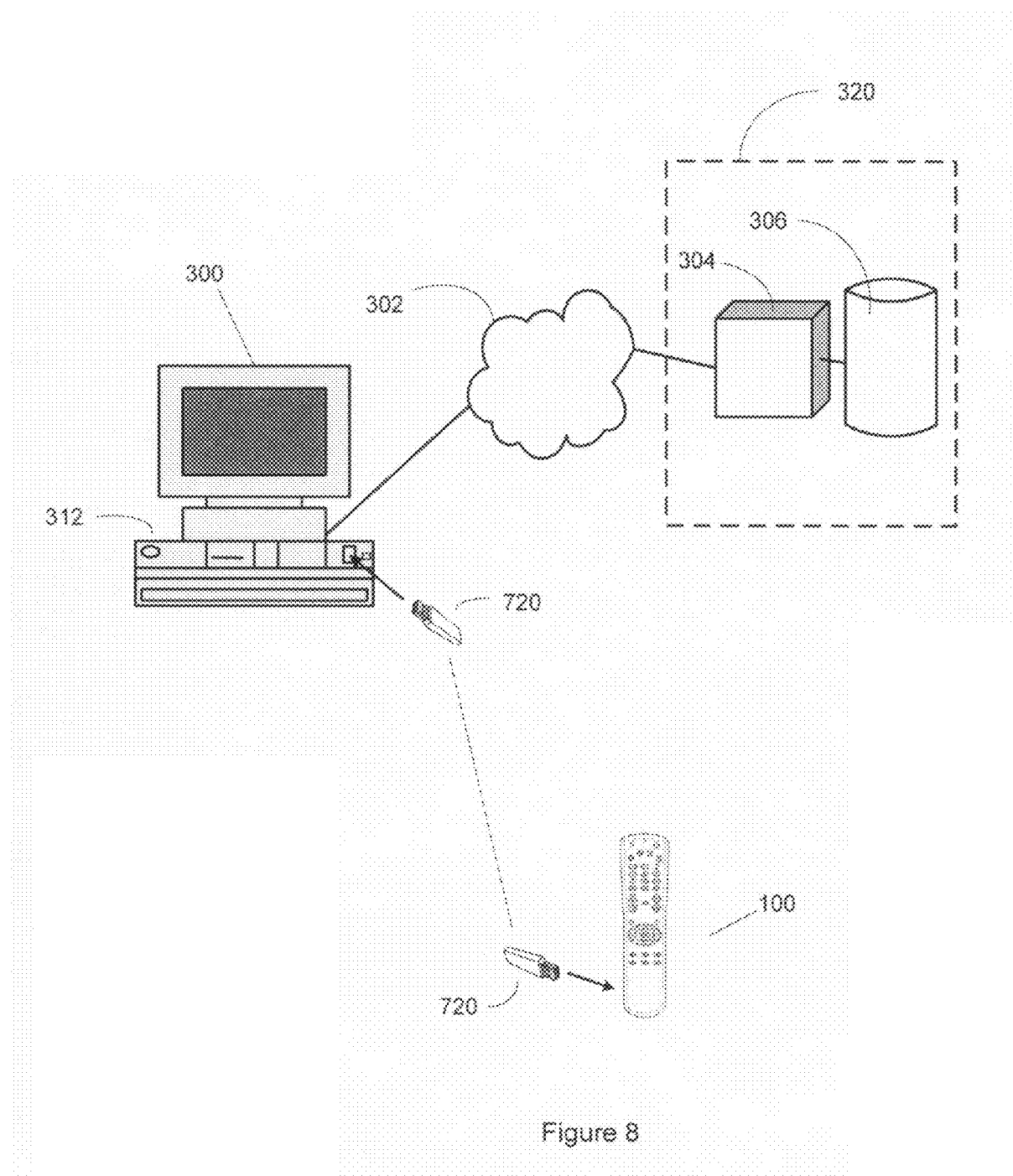
FIG. 8 illustrates an exemplary system by means of which a controlling device may be upgraded using the adapter device of FIG. 7A.

Turning now to FIG. 1, there is illustrated an exemplary system in which a controlling device 100 has been previously adapted to control various controllable appliances, such as a television 102 and a set top box ("STB") 104, for example by being setup using the methods disclosed in U.S. Pat. No. 4,959,810 or other methods as are well known in the art. In keeping with the descriptions which follow and as generally illustrated in FIGS. 3 and 8, in exemplary embodiments a controlling device 100 is now to be further adapted to control a newly-introduced appliance 106, e.g., an appliance introduced at a time after the controlling device 100 left the factory, for which appliance 106 the controlling device 100 was not preprogrammed with a corresponding command code set.

As is known in the art, the controlling device 100 may be capable of transmitting commands to the appliances using any convenient IR, RF, point-to-point, or networked protocol to cause the appliances to perform operational functions, provided the control protocols and command values to be used are known to the operational software of controlling device 100. While illustrated in the context of a television 102, a STB 104, and a new appliance 106, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
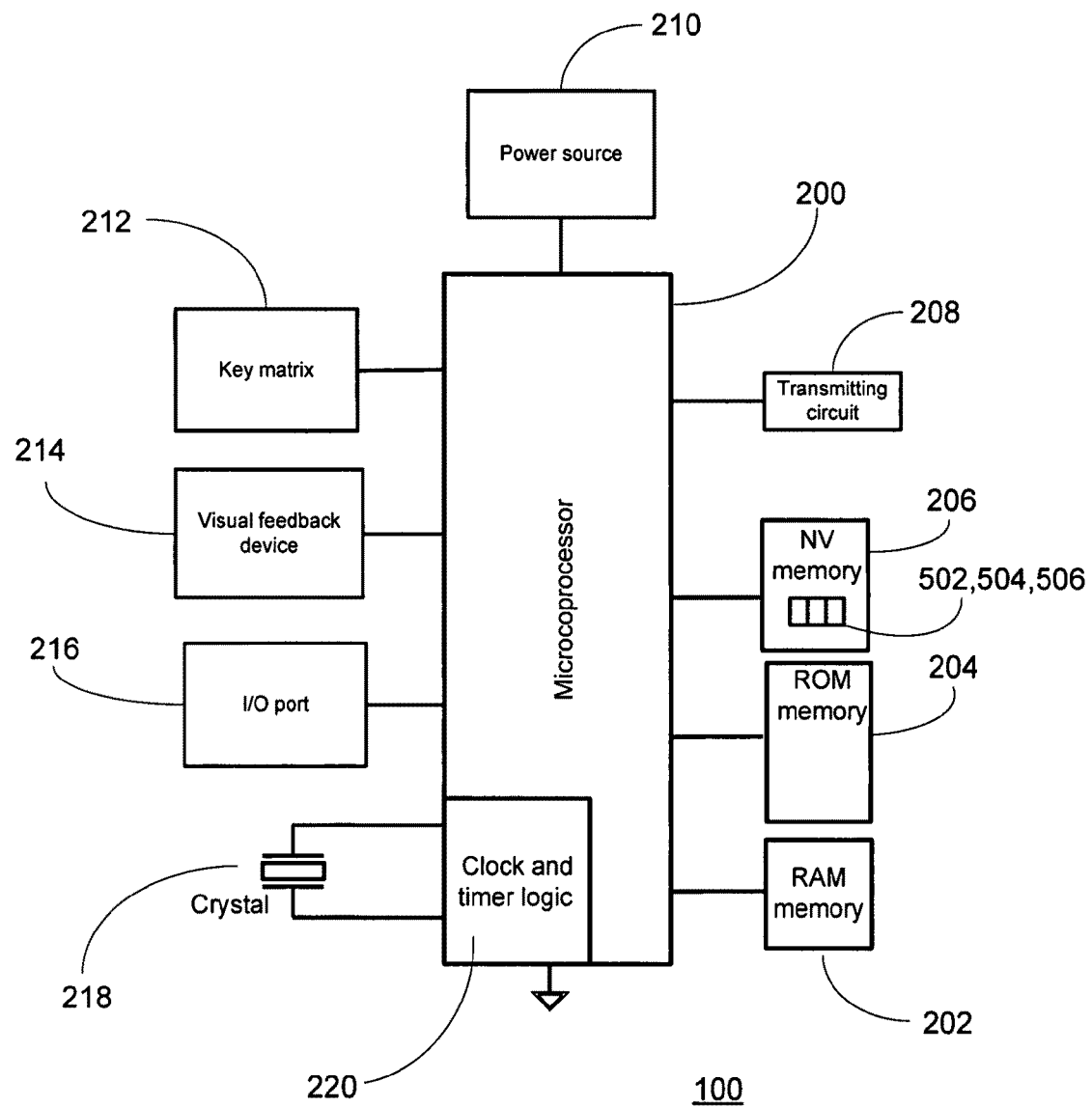
FIG. 2 illustrates a block diagram of components of an exemplary upgradeable controlling device.

With reference to FIG. 2, for use in commanding the functional operations of one or more appliances, the controlling devices 100 may include, as needed for a particular application, a processor 200 coupled to a ROM memory 204, a RAM memory 202, a key matrix 212 (e.g., hard keys, soft keys such as a touch sensitive surface overlaid on a liquid crystal (LCD) or an electroluminescent (EL) display, or some combination thereof), transmission circuit(s) 208 and/or transceiver circuit(s) (e.g., IR and/or RF), a non-volatile read/write memory 206, a means 214 to provide feedback to the user (e.g., one or more LEDs, LCD display, speaker, and/or the like), a power source 210, an input/output port 216 such as a serial interface, modem, Zigbee, WiFi, or Bluetooth transceiver, USB port, etc., and clock and timer logic 220 with associated crystal or resonator 218.

As will be understood by those skilled in the art, some or all of the memories 202, 204, 206 may include executable instructions (collectively, the program memory) that are intended to be executed by the processor 200 to control the operation of the remote control 100, as well as data that serves to define the aforementioned control protocols and command values to the operational software (collectively, the command data). In this manner, the processor 200 may be programmed to control the various electronic components within the remote control 100, e.g., to monitor the power supply 210, to cause the transmission of signals, control visual feedback device(s) 214, etc. All or part of the non-volatile read/write memory 206, for example an EEPROM, battery-backed up RAM, FLASH, Smart Card, memory stick, or the like, may additionally be used to store setup data and parameters as necessary. Further, a portion of non-volatile memory 206 and/or ROM memory 206 may store parameters (502, 504 and 506 in the illustrated example) which may be used to accomplish device authentication and/or secure data transfer operations as will be described in more detail hereinafter. While the memory 204 is illustrated and described as a ROM memory, memory 204 may also be comprised of any type of readable media, such as ROM, FLASH, EEPROM, or the like. Preferably, the memories 204 and 206 are non-volatile or battery-backed such that data is not required to be reloaded after battery changes. In addition, the memories 202, 204 and 206 may take the form of a chip, a hard disk, a magnetic disk, an optical disk, and/or the like. Still further, it will be appreciated that some or all of the illustrated memory devices may be physically incorporated within the same IC chip as the microprocessor 200 (a so called "microcontroller") and, as such, they are shown separately in FIG. 2 only for the sake of clarity.

To cause the controlling device 100 to perform an action, controlling device 100 is adapted to be responsive to events, such as a sensed user interaction with the key matrix 212, etc. In response to an event, appropriate instructions within the program memory (hereafter the "operating program") may be executed. For example, when a function key is actuated on the controlling device 100, the controlling device 100 may retrieve from the command data the command value and control protocol corresponding to the actuated function key and the current device mode, from memory 202, 204, and/or 206, and transmit the command to an intended target appliance, e.g., the STB 104, in a format recognizable by the intended target appliance. It will be appreciated that the operating program can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. An additional local operation is the ability to "lock" function keys across device operational modes as described in U.S. Published Patent Application No. 2003/0025840. Still further, local operations may comprise interacting with an adapter device in order to acquire upgrade data, as described in greater detail hereinafter.

For creating a correspondence between command data and a function key, data may be entered into the controlling device 100 that serves to identify an intended target appliance by its type and make (and sometimes model). Such data allows the controlling device 100 to identify the appropriate command data within a preprogrammed library of command data that is to be used to transmit recognizable commands in a format appropriate for such identified appliances. Since methods for setting up a controlling device to command the operation of specific home appliances are well-known, such methods need not be described in greater detail herein. Nevertheless, for additional information pertaining to setup procedures, the reader may turn for example to U.S. Pat. Nos. 4,959,810, 5,614,906, and 6,225,938 or U.S. patent application Ser. Nos. 09/804,623 and 09/615,473. It will also be appreciated that the controlling device 100 may be set up to command an appliance 102, 104, or 106 by being taught the command codes needed to command such appliance as described in U.S. Pat. No. 4,623,887. Still further, it will be understood that command data may be pre-stored in the controlling device 100 or the controlling device 100 may be upgradeable, for example via use of external input port 216 as described hereafter.

Adapter in the Form of a Cable

Turning now to FIG. 3, in an exemplary embodiment a user of a controlling device 100, upon determining that the command codes required to control operation of an appliance (appliance 106, for example) are not present in the command data currently loaded into memory of the controlling device 100, may connect controlling device 100 to a personal computer ("PC") 300 or the like type of device for the purpose of searching for and downloading the necessary command code data (which may be located in the local storage of PC 300 or may be accessible from a remote server 320 comprising a processing unit 304 and associated storage 306 accessed via the PC 300 or like type of device and a network which interconnects the remote server 320 and the PC 300 such as, for example, the PSTN, Internet, etc. 302.) For the purpose of accomplishing a connection between the controlling device 100 and the PC 300, an interconnection cable 310 may be provided. In general, cable 310 may be made available by the manufacturer of the controlling device or by a third party, and may be supplied together with the controlling device 100 or may be offered as a separate accessory. Interconnection cable 310 may include physical connectors 312, 316 suitable for attachment to mating receptacles on the PC 300 and the controlling device 100, respectively. In alternative embodiments, one or both of these connectors 312, 316 may provide for wireless connections to be made to the respective devices, e.g., the connectors 312, 316 may include circuitry/components that provide a means to transmit signals using either a standard RF or IR protocol such as for example Bluetooth, WiFi, or IrDA, or a proprietary protocol such as for example that described in U.S. Pat. No. 7,167,913 of like assignee and incorporated hereby in its entirety. Interconnection cable 310 may also include a housing 314 accommodating electronics and associated programming as will be described in further detail hereafter.

Figure 4A:
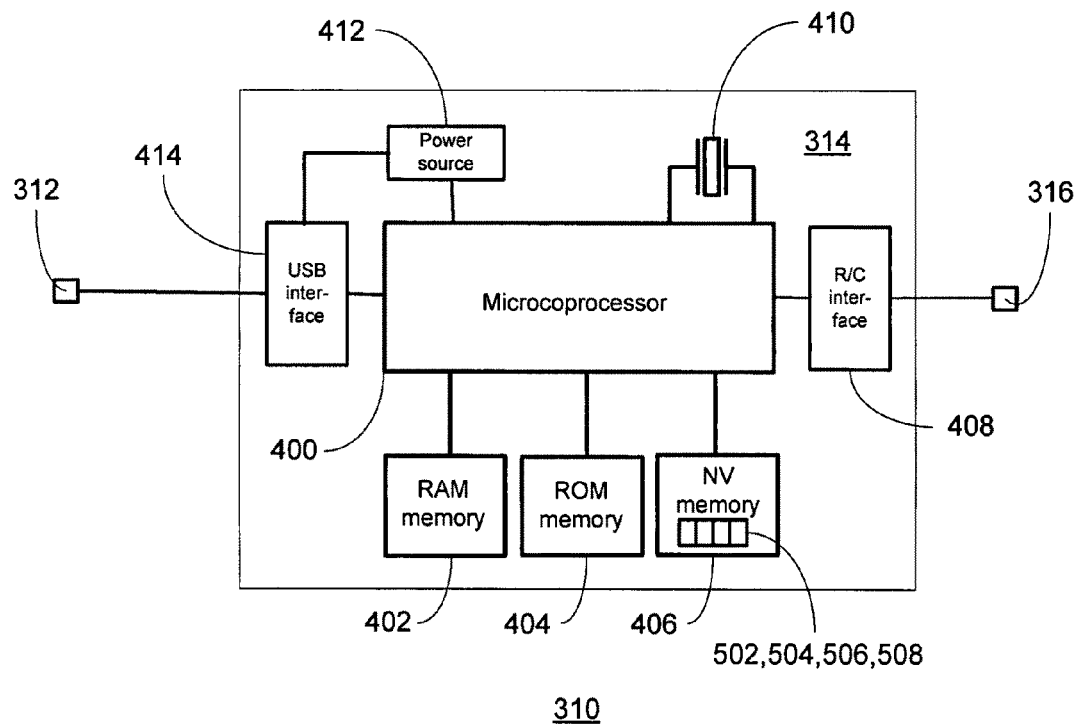
FIG. 4A illustrates a block diagram of components of an exemplary adapter cable which may be used to facilitate the upgrading of an upgradeable controlling device.
Figure 4B:
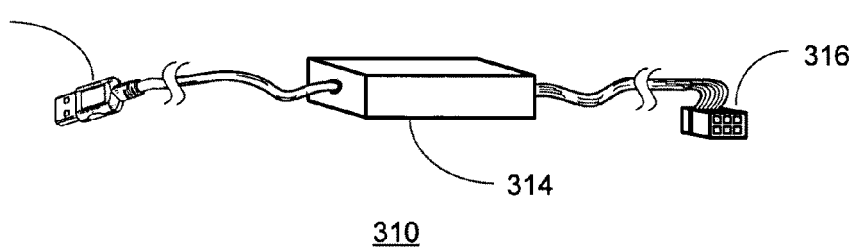
FIG. 4B is a mechanical drawing depicting an exemplary adapter cable of FIG. 4A.

Turning now to FIG. 4A, interconnection cable 310 may include, as needed for a particular application, a microprocessor 400 coupled to a RAM memory 402, a ROM memory 404 and/or a non-volatile (NV) memory 406, a power source 412, a crystal or resonator 410 for microprocessor clocking purposes, and interface adapter circuits (for example voltage level shifters, current detectors, differential drivers, encoding/decoding hardware, etc.) 408,414 as appropriate for the device interfaces to be supported. In the exemplary embodiment illustrated in FIG. 4B, adapter circuit 414 together with connector 312 comprise a USB physical and electrical interface suitable for attachment to a standard USB input/output port of a PC; while adapter circuit 408 and connector 316 comprise a simple point-to-point serial interface suitable for attachment to an I/O port 216 of an exemplary controlling device 100. In keeping with conventional USB practice, source 412 draws power from the PC via the USB connector. It will be appreciated that while this embodiment of interconnection cable 310 is illustrated in terms of a USB to simple serial interface conversion, many other physical, electrical, and logical arrangements of adapter circuits and connectors are possible.

As will be understood by those skilled in the art, some or all of the memories 402, 404, 406 may include executable instructions that are intended to be executed by the microprocessor 400 to control the operation of the interconnection cable 310. In this manner, the microprocessor 400 may be programmed to support the protocols necessary to manage and control the exchange of data between the devices (e.g., controlling device 100 and PC 300) connected to each end of interconnection cable 310. Further, memories 404,406 may additionally include programming in support of security and transaction limiting features, as will be described in greater detail hereafter. All or part of the non-volatile read/write memory 406, for example an EEPROM, battery-backed up RAM, FLASH, Smart Card, memory stick, or the like, may additionally be used to store passwords, encryption keys, data transfer limits, rights management information, etc. as necessitated by the particular application of interconnection cable 310. In an exemplary embodiment to be further described hereafter, non-volatile memory 406 and/or ROM memory 404 may store parameters (502, 504, 506 and 508 in the illustrated example) which may be used to accomplish device authentication and/or secure data transfer operations. Additionally, while the memory 404 is illustrated and lo described as a ROM memory, memory 404 may also be comprised of any type of readable media, such as ROM, FLASH, EEPROM, or the like. Preferably, the memories 404 and 406 are non-volatile or battery-backed such that data is not required to be reloaded after power is interrupted. In addition, the memories 402, 404 and 406 may take the form of a chip, a hard disk, a magnetic disk, an optical disk, and/or the like. Still further, it will be appreciated that some or all of the illustrated memory devices may be physically incorporated within the same IC chip as the microprocessor 400 (a so called "microcontroller") and, as such, they are shown separately in FIG. 4 only for the sake of clarity.

For use in authentication and secure data transfer amongst a controlling device 100, adapter cable 320, PC 300, and a server 320, in an exemplary embodiment encryption keys may be used that are derived, for example, by combining a fixed master value together with a randomly-generated seed value via a non-linear algorithm so as to produce a single large number to serve as an encryption key. In this regard, the particular algorithm utilized is not significant—rather, what is preferred is that the algorithm be sufficiently complex so as to provide no readily-discemable relationship between the seed value and the resulting encryption key value. If the master value and algorithm are secret and known, for example, only to the server 320 and a secure manufacturing site 500 then seed values may be exchanged in clear between devices wishing to authenticate one another.

Figure 5:
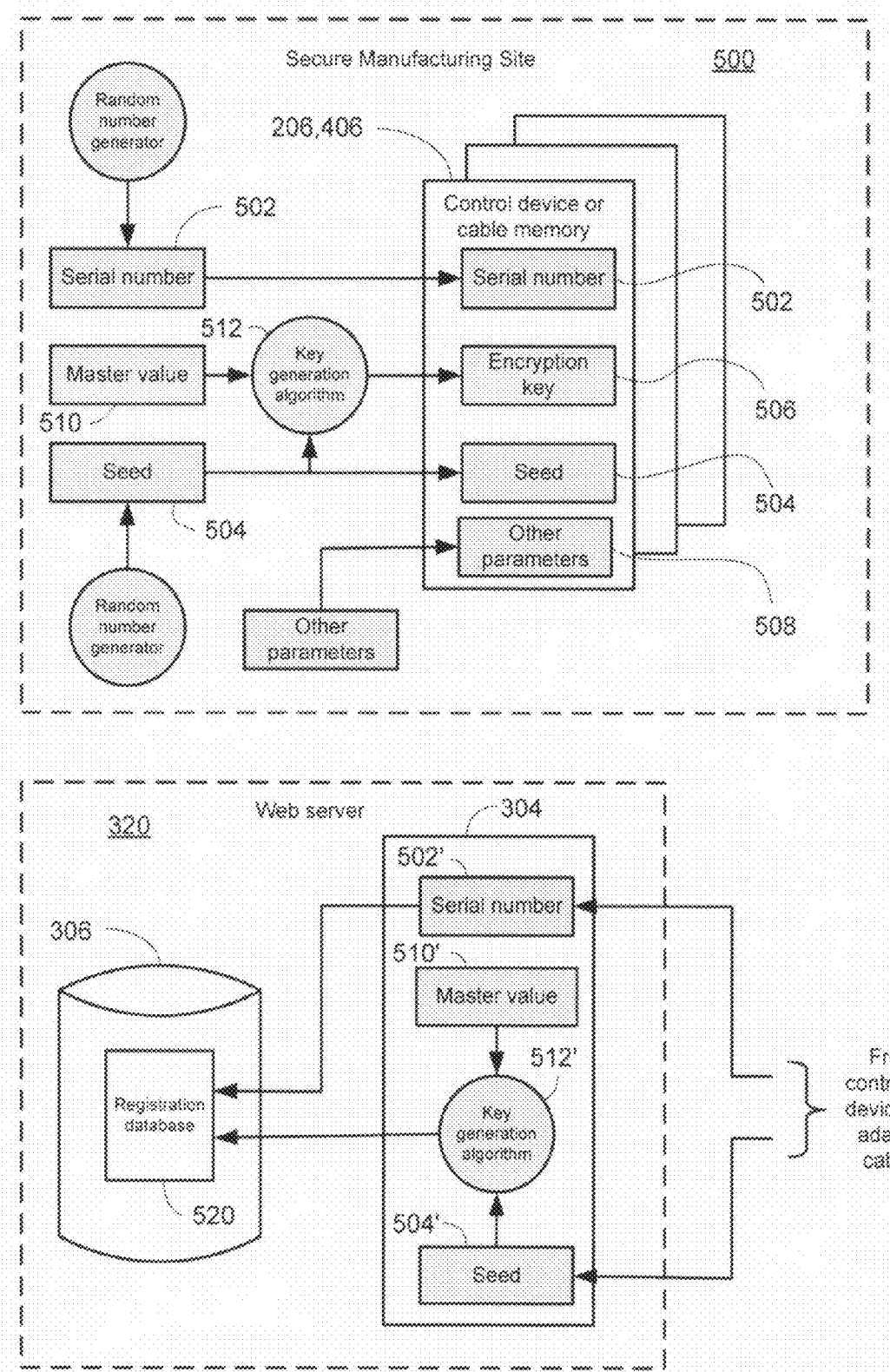
FIG. 5 illustrates an exemplary method for creating and storing encryption key values for use in connection with a mutual authentication and exchange of data between a controlling device or adapter and a server application.

By way of further example and with reference to FIG. 5, a unique random seed value 504 may be created for each controlling device or adapter cable (collectively hereafter referred to as "units") at a secure manufacturing location 500. Manufacturing location 500 is also in possession of a fixed master value 510 (e.g. fixed for this product type) and a key generation algorithm 512, and may thus apply these to each seed value 504 created to produce an individual unit-specific encryption key 506. The seed 504 and resulting encryption key 506, but not the master value 510 or algorithm 512, are stored in the memory 206,406 of each unit. A unique serial number 502 for use in future device identification purposes may also be stored into a unit memory during manufacture. In certain embodiments, the seed 504 and serial number 502 may be the same value. It will be appreciated that in this manner, not only are the master value 510 and key generation algorithm 512 not made public, but also that the computationally-intensive key generation calculation need not be performed by the relatively low-performance embedded microcontroller(s) of the adapter cable 310 or controlling device 100. In addition to the serial number 502, seed 504, and encryption key 506, in certain embodiments additional parameters 508 (for example limits on number of downloads, types of controlling device supported by an adapter cable, etc.) may also be initialized during the manufacturing process, as required by a particular commercial application.

Copies of the fixed master value 510' and the key generation algorithm 512' may, however, be held at a secured server 320 configured for the support of controlling devices such as controlling device 100 connected via adapter cables such as adapter cable 310. To initially authenticate an adapter cable 310 when the adapter cable 310 is first placed in communication with server 320, the unique seed value 504 (and possibly, serial number and/or model information) stored in adapter cable memory 406 may be transferred to server 320. Since the master value 510 and algorithm 512 remain unknown, and there is no discemable relationship between the seed value 504 and the resulting encryption key 506, transfer of this seed value between the adapter cable and the secured server 320 can occur in the clear. It will be understood that in this context the PC 300 or other device, such as an STB, connected to the internet or PSTN may act as a gateway to the remotely located server 320 as illustrated in FIG. 3; or alternatively that the adapter cable may be coupled directly to a server or a server application running on the local PC 300 or like device.

Server 320 may use the received seed value 504' together with master value 510' (which may be one that is appropriate to the unit model if necessary) and key generation algorithm 512' locally stored at the server 320 to recreate the unique encryption key value 506 that previously encoded into the memory 406 of the adapter cable. Once matching encryption keys have been established as described above, i.e., the cable 310 is positively authenticated, the server 320 and adapter cable 310 may engage in a secure handshake transaction to complete authentication of one another. As is known in the art, in order to prevent overuse of the embedded encryption key 506, part of such a transaction may include the exchange of a further randomly-generated symmetric encryption key for use during the current communication session only.

It will thus be understood and appreciated that many different algorithms and/or authentication systems may be appropriately employed by one skilled in the art to effect the secure data transfer described herein without limiting the scope of the current invention.

Once adapter cable 310 has thus been authenticated, to establish a relationship between the controlling device 100 and the secure server 320, the above seed transfer and secure handshake transaction may be repeated using the seed and encryption key values stored in controlling device memory 206. Once this has been completed, server 320 is thereafter able to communicate in a secure manner with both the adapter cable and the controlling device individually. Data destined to be passed through the adapter cable to controlling device 100 may be encrypted using the keys established between the server and the controlling device 100, while data or commands destined for the adapter cable itself (e.g. updating download counters, etc.) may be encrypted using the separate keys established between the server and the adapter cable 310.

Figure 6:
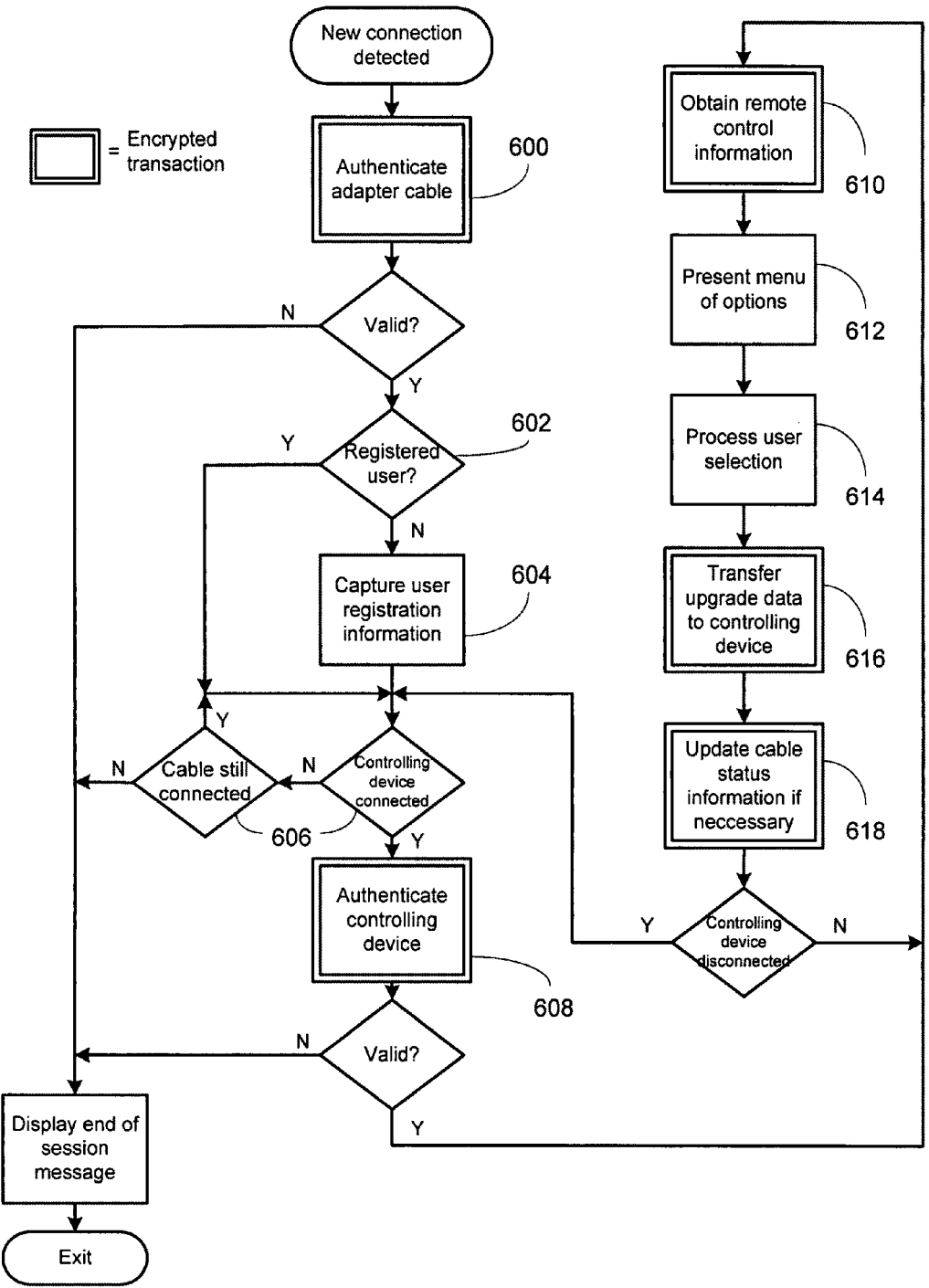
FIG. 6 illustrates in flow chart from an exemplary series of steps which may be performed by a server application in connection with upgrading a controlling device.

Turning now to FIG. 6, there is illustrated in flowchart form the general series of activities which may take place during an exemplary interaction between a user of an upgradeable controlling device 100 and a server 320 which is a source of upgrade data (it being understood that the server 320 may comprise an application entirely resident on a user's local PC 300, or may comprise a remote site accessed via the Internet or PSTN 302, in which latter case the user's PC 300 may serve to provide a user interface and communication gateway service via the use of an application such as a Web browser, a local applet, etc.). When a new adapter cable connection is detected (e.g., using USB plug-and-play methods as are well known in the art) the server application may initially authenticate 600 the adapter cable 310 in the manner described previously. Once authenticated, the sever application may next determine 602 if the just-connected adapter cable 310 is a previously registered device (using for example an adapter cable serial number obtained during the authentication transaction). If not, the server application may create a new entry for this adapter cable in registration database 520 and may further solicit registration information from the user 604 to be associated with the adapter cable serial number 502. User-provided registration information may comprise, for example, geographic location of the user, type of user (e.g. distributor, dealer, or end user), types and brands of controllable equipment owned, etc., without limitation. Registration database 520 may also include associations between specific controlling devices and specific adapter cables, as will be described in further detail hereafter. The information provided by the user during registration may be utilized to customize that user's experience by, for example, tailoring the selection and/or order of presentation of upgrades offered to reflect the relative popularity of brands in a particular geographic region and/or to match the brands and types of controllable equipment owned; to reflect services available in a region (e.g. cable channel line-up, satellite providers, etc.); to display regional special offers of goods or services; etc. Registration database 520 may also be used for security purposes, e.g., for rights management and/or access control which may impose limits on the number and/or type of upgrades which requested by a particular adapter cable or controlling device. Such limits may be absolute, or may be time dependent (e.g., a maximum number of requests per unit time so as to inhibit "data mining" or automated access.)

After an adapter cable has been authenticated and its registration status verified, if desired in the provision of services, the server application may then wait 606 until the adapter cable 310 reports that a controlling device (e.g., controlling device 100) is also connected to the adapter cable 310, whereupon the server application may authenticate 608 the connected controlling device as described previously. Once controlling device authentication is complete, the sever application may obtain 610 configuration information from the controlling device. Such configuration information may include, for example, type and model, serial number, current settings, previous upgrades, etc. All or part of this information may be stored by server 320 in association with the adapter cable registration database entry. Alternatively, this information may be stored separately, either in server storage 306, in the memory 402,406 of the adapter cable itself, or in the case of PC 300 being used as a gateway device in the local storage of PC 300. In an exemplary embodiment, the server application may use this device-specific information together with the previously provided user and adapter cable information to configure and present 612 to the user a menu of possible upgrade options available for the connected controlling device. Such upgrade options may include, without limitation, additional command codes for control of device(s) not supported by the command data already stored in controlling device 100, firmware updates, new or modified user interface graphics, pre-programmed command sequences, etc.

After the user has selected 614 the desired upgrade(s), the server application may securely transfer 616 the requested data to the controlling device by encrypting the same using the controlling device encryption keys established during the previously described controlling device authentication process. In embodiments where access control or configuration parameters (e.g., 508) are stored wholly or partially in the memory of adapter cable 310, the server application may securely transfer 618 cable data to the adapter cable 310 by encrypting the same using the adapter cable encryption keys established during the previously described adapter cable authentication process.

Adapter in the Form of a Portable Memory Device

Figure 7A:
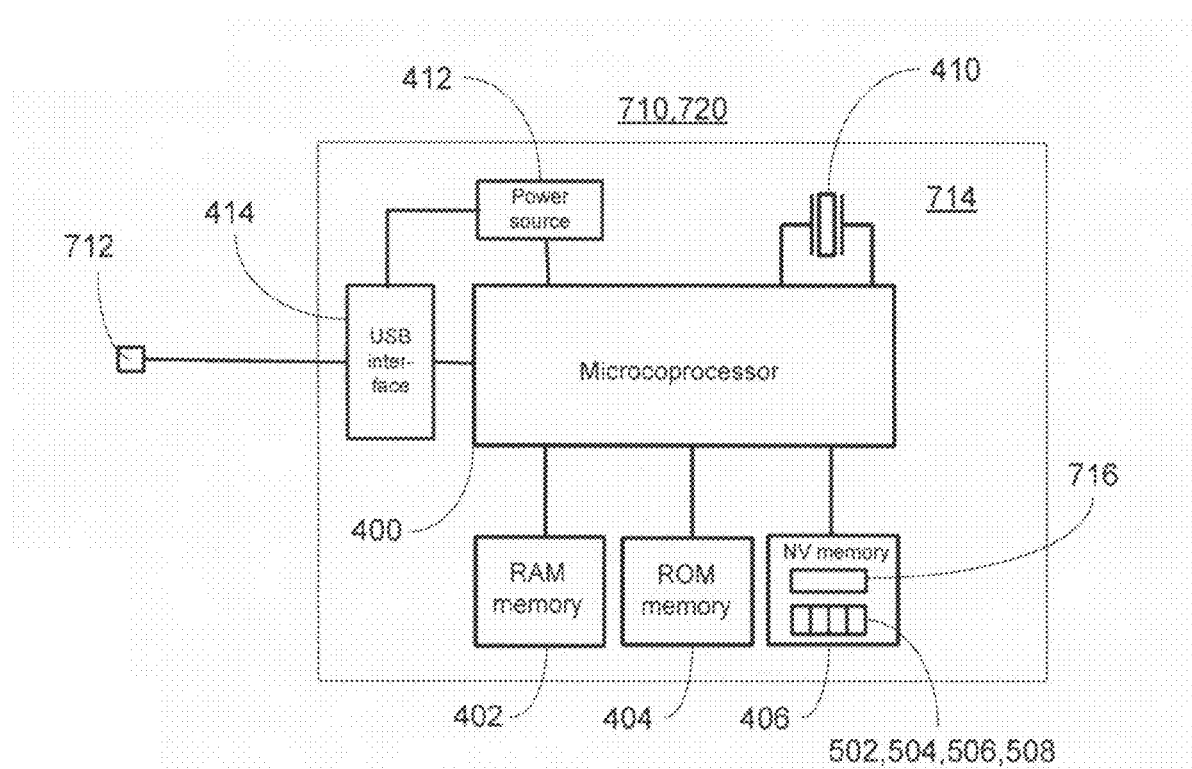
FIG. 7A illustrates a block diagram of an exemplary alternative implementation of an adapter device which may be used to facilitate the upgrading of an upgradeable controlling device.
Figure 7B:
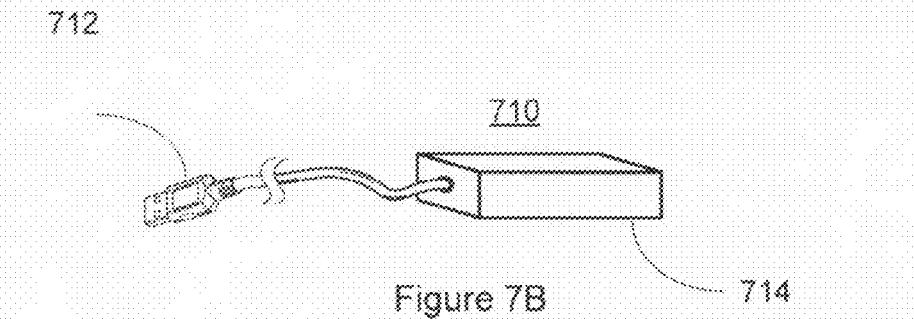
FIG. 7B is a mechanical drawing depicting an exemplary adapter device of FIG. 7A.
Figure 7C:
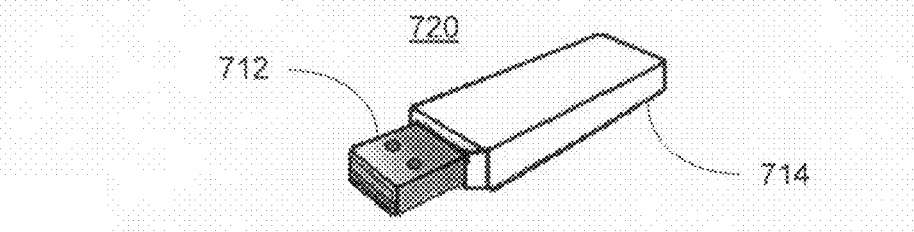
FIG. 7C is a mechanical drawing depicting a further exemplary adapter device of FIG. 7A.

Turning now to FIGS. 7A-C, in a further exemplary embodiment an adapter device may be sequentially coupled to each of a PC 300 and a controlling device 100 as separate steps, rather than functioning as a bridge between the two as in the previously described embodiment. In this embodiment, upgrade data 716 may be first transferred from server 320 into adapter memory 406 and then subsequently transferred from adapter memory 406 to controlling device 100 in a separate step. While the adapter configuration 310 of FIG. 4A may also be used for this embodiment, advantageously both PC 300 and controlling device 100 may utilize I/O interfaces which are physically or operatively compatible (for example, both in accordance with the USB specification, or various RF and/or electromagnetic communication methods as are well known in the art), thus permitting the two connectors 312,316 of the previous embodiment to be replaced by the single connector 712 of illustrative adapter embodiments 710 or 720 (in the case of a physical coupling mechanism). It will be appreciated that the electronics contained within the housing 714 of these embodiments may be similar to that of adapter cable 310, sans the second interface circuit 408 and connector 316. Accordingly, in the interest of brevity the individual components are like numbered in FIG. 7A and will not be described further herein. However, in this embodiment, programming stored in memories 402,404,406 may include instructions for managing a step-by-step transfer of upgrade data 716 as described hereafter.

Figure 9:
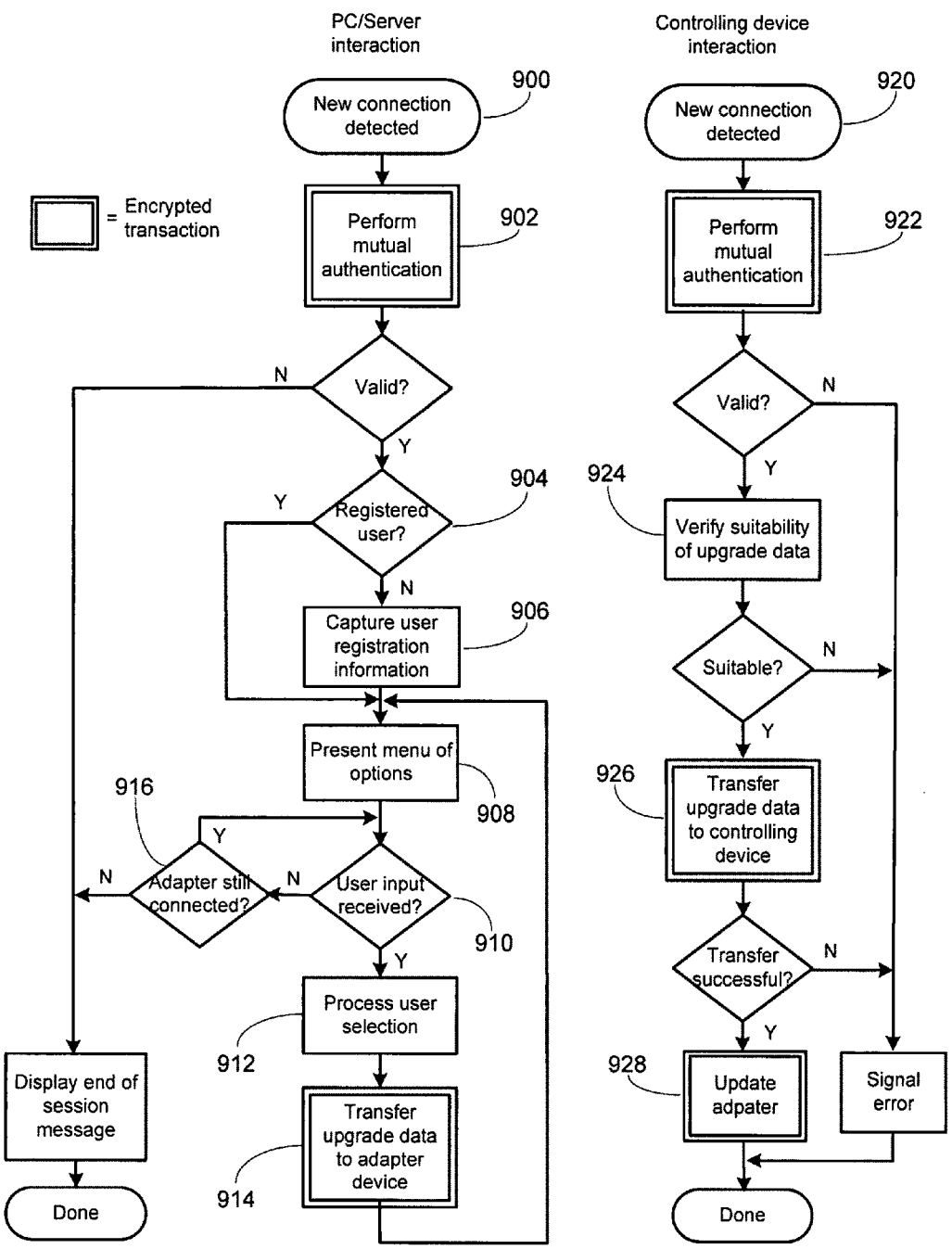
FIG. 9 illustrates in flowchart form an exemplary series of steps which may be separately performed by a server application and a controlling device in connection with upgrading a controlling device using the adapter device of FIG. 7A.

Turning now to FIGS. 8 and 9, there is illustrated in bock diagram and flowchart form an exemplary two-step transfer of upgrade data between a PC 300 (linked to or including a server 320) and a controlling device 100, via an adapter 720 of the type described in the preceding paragraphs. In an exemplary upgrade process, adapter 720 is first placed into communication with PC 300, for example by being physically or wirelessly coupled thereto. When this action is detected 900, mutual authentication 902 and user registration 904,906 are performed in the same manner as previously described in connection with FIG. 6. After such confirmation is complete, the authorized user is presented with a menu of options 908 from which the desired upgrade(s) may be chosen. Upon receipt of user selection(s) 910, these requests are processed 912 by server application 304 into an upgrade data set 716 for secure transfer 914 to adapter device 720 and stored in adapter memory 406, after which adapter device 720 may be disconnected 916 from PC 300.

After the desired upgrade data 716 has been loaded into adapter 720 as described above and adapter 720 is disconnected from PC 300, adapter 720 may be subsequently placed into communication with controlling device 100, either contemporaneously or at a later time. When controlling device 100 detects 920 that adapter 720 has been placed into communication with it, for example by being by being physically or wirelessly coupled thereto, a mutual authentication process 922 may be initiated. This may be similar to that conducted between PC 300 and adapter 720, or make comprise any other suitable method as appropriate. Additionally, after initial authentication is completed the process may also incorporate verification 924 that the upgrade data 716 to be loaded is suitable for use by controlling device 100, for example by validating model, version, configuration, etc. values provided by controlling device 100 against similar values previously provided by server application 304 in conjunction with the upgrade data 716 currently stored in adapter 720. Once the upgrade data 716 has been verified as suitable, it may be transferred 926 to controlling device 100. After completion of the transfer, the status of adapter 720 may be updated to reflect this event (e.g., updating counters, in some instances erasing the working copy of upgrade data 716 to free up all or part of adapter memory 406 for future uses, etc.) after which the upgrade transaction is complete.

It will be appreciated that other transaction sequences are possible. For example, in some embodiments adapter 720 may be initially coupled with controlling device 100 in order to obtain configuration information (e.g., model number, serial number, current setup, etc.), then attached to PC 300 to submit that information to server application 304 and receive appropriately configured upgrade data, and then re-coupled with controlling device 100 to complete transfer of the downloaded upgrade data. It will also be appreciated that in certain embodiments wherein multiple controlling devices are to be provided with the same upgrade data, adapter device 720 may be sequentially coupled with several controlling devices without intervening reattachment to PC 300 for the purposes of upgrading each controlling device identically. Advantageously, in this embodiment adapter device may include a count value in memory 406 which may be preloaded by PC 300 in conjunction with the upgrade data and used to limit the total number of permitted transfers of the upgrade data. Alternatively, other values (e.g., a time period or expiry date for verification by a date-enabled controlling device) may be used to limit the applicability of the upgrade data, or in certain cases no limits may be imposed.

Exemplary Applications of Adapter Devices

It will be appreciated that the methods and systems described above provide great flexibility in implementing secure and controlled upgradeability of controlling devices. By way of example, without limitation, several possible embodiments are presented below:

Case 1: Adapter for retail sale to an end user. The server upgrade application and associated registration database may be tailored to establish a one-to-one relationship between a specific adapter 310,710,720 and a specific controlling device 100. In this manner, purchasers of adapters may be individually enabled to request an unlimited number of upgrades for a single, specific, controlling device owned by them. In an alternative embodiment, an adapter may be loaded at a factory 500 with a predetermined limit (e.g. 508) to the number of upgrades which may be requested. This limit may be decremented by the server application or upgraded controlling device after each upgrade request is completed (e.g. at step 618 of FIG. 6 or step 928 of FIG. 9) and the adapter may cease to function when the value reaches zero. In an alternate embodiment, a user may be permitted to replenish limit 508 by purchasing additional upgrades as part of a secure transaction with server 320.

Case 2: Adapter provided for use by a dealer, distributor, service center, etc. The server upgrade application and associated registration database in this case may be tailored to establish a one-to-many relationship between the adapter and a specific population of controlling devices, allowing unlimited upgrades to that population. The authorized population of controlling devices may for example comprise only those controlling device models or versions offered for sale by that merchant, only those models or versions offered for sale in a particular geographic region, only those controlling devices with serial numbers which fall within certain range(s), or any other limitation as may be commercially desirable.

Case 3: Adapter provided for use by an order fulfillment site, satellite manufacturing operation, bulk configurator, etc. For certain classes of controlling device, it may be desirable to manufacture stock units which are held in inventory at a central location and loaded with a final configuration immediately prior to shipment to a customer. Examples may include controlling devices destined for cable television system operators where channel line-ups may vary from location to location; customizable "off-the-shelf" remote controls units which are sold to smaller equipment manufacturers; etc. The server upgrade application and associated registration database in this case may be tailored to establish a fixed relationship between an adapter, a specific type or model of controlling device, and a specific set of data to be downloaded.

It will be appreciated that, particularly in cases 2 and 3 presented above, use of an adapter 710, 720 in the form of a portable memory device may be advantageous in that PC 300 or other server gateway device need not be physically adjacent to the controlling device to be upgraded.

It will be further appreciated that in any of the above presented cases, the frequency and number of upgrade requests originating from a particular adapter (and by inference, the registered user associated with that adapter) may be monitored in order to prevent abuse, e.g. to identify and suppress attempts at data mining, wholesale downloads of entire data categories, etc.

While various concepts have been described in detail, it will be appreciated by those skilled in the art that various modifications and alternatives to those concepts could be developed in light of the overall teachings of the disclosure. For example, in certain embodiments, an adapter of the type described above may be used in conjunction with a controlling device which does not itself include any authentication and encryption capabilities. In this case, the adapter alone may serve to identify and authenticate qualified service personnel and/or to provide for security (e.g. encryption) of the upgrade data while in transit from the server via a public network. In yet another embodiment, provision may be made for an upgradeable controlling device to authenticate itself to the adapter using different methods to those used in connection with the adapter/server authentication process. It will also be appreciated that, while the authentication basis of the exemplary embodiment described above comprises the mutual match of an encryption key derived from a publicly transferred seed, many alternative techniques are available and accordingly any appropriate value pre-established within a device prior to the authentication process and/or algorithm may be used for this purpose without departing from the spirit of this invention.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for using an adaptor device having a memory and an interface used to individually establish a communication coupling with both a first device and a second device and to provide secure access to a database of upgrade data, comprising:
    placing the interface of the adaptor device into communication with the second device through which the database of upgrade data is accessible;
    attempting to authenticate the adaptor device at the second device using a pre-established value stored in the memory of the adaptor device;
    allowing upgrade data from the database of upgrade data to be downloaded to the memory of the adaptor device via the second device only after the adaptor device is authenticated through use of the pre-established value stored in the memory of the adaptor device; and
    placing the interface of the adaptor device into communication with the first device to thereby transfer at least a portion of downloaded upgrade data from the memory of the adaptor device to the first device.

2. The method as recited in claim 1, comprising replicating the pre-established value at the second device to thereby authenticate the adaptor device.

3. The method as recited in claim 1, wherein the pre-established value comprises an encryption key value.

4. The method as recited in claim 1, comprising accessing the database of upgrade data to download into the memory of the adaptor device upgrade data appropriate for use by the adaptor device.

5. The method as recited in claim 4, comprising encrypting the adaptor device upgrade data using an encryption key value stored in the memory of the adaptor device.

6. The method as recited in claim 5, wherein the adaptor device upgrade data comprises a new encryption key value.

7. The method as recited in claim 1, comprising storing in the memory of the adaptor device data used to limit access to the upgrade data stored in the database of upgrade data.

8. The method as recited in claim 7, wherein the limit comprises a time dependent limit.

9. The method as recited in claim 7, wherein the limit comprises an absolute limit.

10. The method as recited in claim 1, wherein the interface of the adaptor device provides a wireless connection between the adaptor device and the first and second devices.

11. The method as recited in claim 1, wherein the interface of the adaptor device provides a wired connection between the adaptor device and the first and second devices.

12. The method as recited in claim 11, wherein the interface of the adaptor device comprises a USB interface.

13. The method as recited in claim 1, comprising using data stored in the memory of the adaptor device to register the adaptor device with a registration database.

14. The method as recited in claim 1, comprising:
    placing the interface of the adaptor device into communication with the first device;
    downloading from the first device to the memory of the adaptor device via the interface a further pre-established value stored on the first device;
    placing the interface of the adaptor device into communication with the second device;

attempting to authenticate the first device using the further pre-established value stored in the memory of the adaptor device at the second device; and allowing upgrade data appropriate for use by the first device to be downloaded to the memory of the adaptor device from the database of upgrade data via the second device only after the first device is authenticated through use of the further pre-established value stored on the first device and downloaded into the memory of the adaptor device.

15. The method as recited in claim 14, wherein the first device comprises a controlling device and the upgrade data appropriate for use by the first device comprises command data.

16. The method as recited in claim 14, wherein the further pre-established value stored on the first device comprises an encryption key value.

17. The method as recited in claim 14, comprising using the further pre-established value stored on the first device to encrypt the upgrade data appropriate, for the first device.

18. The method as recited in claim 14, comprising using data stored on the first device received at the second device via use of the adaptor device to register the first device in a registration database.

19. The method as recited in claim 18, comprising using the registration database to select upgrade data from the upgrade database for downloading to the first device via use of the adaptor device.

20. The method as recited in claim 1, wherein the second device comprises a gateway device in communication with a server device by which the database of upgrade data is accessible.

21. A system for providing secure access to a database of upgrade data, comprising:
a first device;
a second device through which the database of upgrade data is accessible; and
an adaptor device having an interface used to individually establish a communication coupling with both a first device and a memory in which is stored a pre-established value used to provide secure access to the database of upgrade data;
wherein the second device attempts to authenticate the adaptor device using the pre-established value stored in the memory of the adaptor device and allows access to the database of upgrade data via the adaptor device only after the adaptor device is authenticated through use of the pre-established value stored in the memory of the adaptor device and wherein the database of upgrade data comprises upgrade data appropriate for use by at least one of the adaptor device and the first device.

22. The system as recited in claim 21, wherein the second device replicates the pre-established value to thereby authenticate the adaptor device.

23. The system as recited in claim 22, wherein the pre-established value comprises an encryption key value.

24. The system as recited in claim 21, wherein the second device functions to download into the memory of the adaptor upgrade data appropriate for use by the adaptor device.

25. The system as recited in claim 24, wherein the second device encrypts the adaptor device upgrade data using an encryption key value stored on the adaptor device.

26. The system as recited in claim 25, wherein the adaptor device upgrade data comprises a new encryption key value.

27. The system as recited in claim 21, wherein the memory of the adaptor device has stored therein data used by the second device to limit access to the upgade data stored in the database of upgrade data.

28. The system as recited in claim 27, wherein the limit comprises a time dependent limit.

29. The system as recited in claim 27, wherein the limit comprises an absolute limit.

30. The system as recited in claim 21, wherein the interface of the adaptor device establishes a wireless connection with the first and second devices.

31. The system as recited in claim 21, wherein the interface of the adaptor device establishes a wired connection with the first and second devices.

32. The system as recited in claim 31, wherein the interface of the adaptor device comprises a USB interface.

33. The system as recited in claim 21, comprising a registration database associated with the second device in which is stored data read from the memory of the adaptor device.

34. The system as recited in claim 21, wherein the first device has stored therein a further pre-established value, the adaptor device is used to store in the memory of the adapter device and thereafter provide the pre-established value from the first device to the second device, and the second device attempts to authenticate the first device using the pre-established value stored in the memory of the first device and allows upgrade data appropriate for use by the first device to be downloaded to the memory of the adaptor device only after the first device is authenticated through use of the pre-established value stored on the first device.

35. The system as recited in claim 34, wherein the first device comprises a controlling device and the upgrade data appropriate for use by the first device comprises command data.

36. The system as recited in claim 34, wherein the pre-established value stored on the first device comprises an encryption key value.

37. The system as recited in claim 36, wherein the second device uses the encryption key value stored on the first device to encrypt the upgrade data appropriate for use by the first device.

38. The system as recited in claim 34, comprising a registration database associated with the second device in which is stored data received from the first device via use of the adaptor device.

39. The system as recited in claim 38, wherein the second device uses the registration database to select upgrade data from the upgrade database for downloading to the first device via use of the adaptor device.

40. The system as recited in claim 34, wherein the second device comprises a gateway device in communication with a server device by which the database of upgrade data is accessible.

41. The system as recited in claim 21, wherein the memory of the adaptor device has stored therein data used by the adaptor device to limit downloads of upgrade data from the adaptor device to the first device.

42. The system as recited in claim 41, wherein the limit comprises a time dependent limit.

43. The system as recited in claim 41, wherein the limit comprises an absolute limit.

* * * * *